3,518,103
PROCESS FOR PRODUCING A NYLON-COATED LEATHER-LIKE PRODUCT
Lubomir Visnovsky, Waterloo, Belgium, assignor to Monsanto Europe S.A., Brussels, Belgium, a Belgian company
No Drawing. Filed Jan. 23, 1967, Ser. No. 610,750
Int. Cl. D06n *3/08;* B44d *1/16;* B32b *27/34*
U.S. Cl. 117—11　　　　　　　　　　　　　　　2 Claims

ABSTRACT OF THE DISCLOSURE

Nylon-coated products comprised of a substrate having a layer of nylon bonded thereto are prepared by employing an adhesive containing a polyurethane rubber and an organic polyfunctional isocyanate to accomplish the bonding. The nylon coating is normally applied onto a sheet of polyvinyl chloride material or the like to produce a leather-like cloth.

---

The unique properties of nylon make it a useful material in the production of coatings on a wide variety of other materials. Such coatings give protection because of the durability of the nylon, and they also enhance the appearance of the materials. In many instances however there are difficulties in forming a nylon layer which adheres satisfactorily to the surface to which it is to be applied.

A new method has now been developed which in a most effective way unites a nylon coating to a substrate to produce a nylon coated product. The novel product of this invention is one which comprises a substrate having a nylon bonded to it by means of an adhesive containing a polyurethane rubber and an organic isocyanate.

The product of the present invention is produced by a process in which the adhesive is interposed between the nylon and the substrate to be coated. The combined structure is then heated under conditions such that the components are united together. In general, the components interact and any solvents, if present, are evaporated.

In practice it is convenient if the adhesive is used in the form of a solution in a suitable solvent. The nylon will normally also be in the form of a solution to facilitate easier application thereof.

The nylon can be bonded by means of the adhesive to a large number of different types of surfaces, and these can for instance be plastic materials, wood, paper, metal, and woven or non-woven textile fabrics. Plastic materials can be sheets or films or in the form of other shapes, and can, if desired, be expanded materials. Suitable materials include vinyl polymers, such as polyvinyl chloride, polyvinylidene chloride, or a copolymer of vinyl chloride; a polyvinylaromatic plastic, such as polystyrene; a polyacrylate, such as methyl polymethacrylate; or a polyolefin such as polyethylene or polypropylene. Excellent results are obtained with polyvinyl chloride (PVC) both in a dense and an expanded form.

The adhesive contains a polyurethane rubber, that is to say a rubber derived from appropriate proportions of a diisocyanate and an organic compound having active hydrogen atoms, for instance a compound containing hydroxyl groups. For convenience in handling, the rubber is employed in the process of the invention in the form of a solution. The rubber in such case should be soluble in a solvent. This means in this instance that the polyurethane rubber is essentially linear, although a minor degree of cross-linking can exist and often will be present. Where the rubber is not completely cross-linked it will contain active hydrogen atoms, as determined by the Zerwitinoff test. Hydroxyl groups can be present in the rubber and this is often preferred. An example of a suitable commercial linear polyurethane rubber is the product sold by Bayer under the trade name of Desmocoll, or that sold by Goodrich under the trade name of Estane.

The other necessary ingredient of the adhesive is an organic isocyanate, normally a polyfunctional isocyanate such as a diisocyanate or tri-isocyanate, which can for example be one of the type employed in the production of polyurethane rubbers, for instance m-tolylene diisocyanate. Other isocyanates are ethylene diisocyanate, propylene diisocyanate, cyclo-hexylene-1,4-diisocyanate, 4,4'-diphenylmethane diisocyanate, xylylene diisocyanate and triphenylmethane tri-isocyanate.

Normally it is preferable that the adhesive should also contain a solvent for the components. The solvent can be for example a ketonic solvent such as an ester or ketone, and examples are ethyl acetate, butyl acetate, methyl ethyl ketone and cyclohexanone. Other types of solvent can also be used, for example dimethylformamide or a furan. A mixture of solvents can be employed. Normally the isocyanate component is used in an amount which is small compared with the polyurethane rubbers. For instance, the quantity of the isocyanate present can be between 10 and 50% by weight of the rubber. A thickening agent can also be present if desired to give a liquid having a viscosity consistent with the method of application that is chosen. The adhesive can be applied to the substrate at the rate of 20 to 50 grams per square yard. The adhesive contains reactive ingredients and should be maintained under such conditions that these do not react together; however, a typical adhesive can have a useful life at room temperature of several days. It is desirable that water should be excluded from the adhesive so far as is practical.

The nylon layer is preferably applied as a composition which is a solution and it is often convenient to use an alcohol-soluble nylon such as nylon 6,6. Alcohol-soluble nylon will usually have a rather lower molecular weight below about 1,000. The alcohol can be for example an alcohol such as methanol, ethanol or isopropanol. Other solvents include halogenated materials, such as chloroform or trichloroethylene. A thickening agent can be present to give a liquid having a viscosity suitable for application. A pigment can also be present in the composition if the final coating is to be colored. The nylon composition may be applied in the range of from about 50 to 100 grams per square yard. Additional layers of the nylon composition can be applied to the first layer if desired. In general, other nylons can be employed, which include nylon 6, 610 and nylon 11 or copolymers and terpolymers thereof. A solvent is not essential in all instances since it is not necessary that the nylon be applied as solution. For example, a nylon laminate can be applied to the adhesive and bonded by means of heat and pressure.

Where the nylon is present on an expanded polyvinyl chloride (PVC) in sheet form the resulting product is very similar to a leather cloth, particularly where the expanded PVC incorporates a textile fabric base. A leather-like cloth of the latter type can be produced of excellent quality, with an appearance which closely resembles that of a high quality soft leather. For example, after flexing the surface contains a multitude of very fine wrinkles of the type which are present in leather products such as kid leather. The product can be used in the production of garments, handbags and soft furnishings.

Generally, in carrying out the invention, the adhesive and the nylon composition can be applied in any suitable manner. Each can for example be applied to the substrate by spraying, brushing or rolling. A typical four roll printing machine having at least two heads is suitable since one printing head can be employed to apply the adhesive and another to apply the nylon composition.

Preferably the adhesive is applied to the substrate and heated for a short period to gel the adhesive, but this is not essential. The nylon composition is then applied uniformly to the substrate. The resulting assembly passes to a zone where sufficient heat is applied to cause interreaction between the components, and the adhesive bonds the nylon to the substrate. A temperature in the range of 90° to 125° C. is often sufficient. The solvents which are normally present in the adhesive and the nylon composition are evaporated at this stage. In another procedure the nylon coating is applied to a release backing, for example a paper or textile fabric which has been treated with a release agent, such as a silicone. The nylon composition is then allowed to dry, and the adhesive is applied to the nylon, followed by the substrate. After allowing solvents to evaporate and heating to enable any necessary interaction of components to occur, the resulting product is stripped from the release backing.

The leather-like cloth (where the substrate is a textile-based expanded PVC) can be produced by either of the above procedures. For instance an expandable PVC composition is first applied to the textile fabric which is supported for example on a band of silicone-treated release paper. The fabric and PVC composition are then heated to a suitable temperature to gel the PVC composition and produce an expanded material by decomposition of the blowing agent. This can be separated from the release backing if desired. The adhesive can then be applied, followed by the nylon coating as indicated above. After its production the product can be embossed if preferred. It can also be stretched, either longitudinally or laterally or both, in order to obtain a multitude of fine cracks in the nylon layer which makes the material resemble leather. The stretching operation can be carried out at the end of the process on the treated leather-like cloth or before one or more of the nylon layers has hardened.

Where an expanded PVC is employed as the substrate to produce a leather-like cloth, the expanded substrate is produced by the action of a blowing agent on a plasticized PVC. Plasticizers which can be used include phthalate, adipate, sebacate, or phosphate esters, or sulphonamides; for instance dibutyl, dihexyl, or dioctyl phthalate, or butyl benzyl phthalate; dibutyl or didecyl adipate; or tributyl, triphenyl, tricresyl or phenyl cresyl phosphate. A wide variety of other plasticizers including mixtures of plasticizers can be employed. The degree of plasticization can, for example, be between 10 and 150% (i.e. from 10 to 150 parts by weight of plasticizer to 100 parts by weight of PVC), particularly for example between 60 and 100%, such as about 80%. The blowing agent is normally one which is capable of liberating a gas, when required, such as nitrogen or carbon dioxide. A suitable blowing agent can for example be a carbonate or bicarbonate salt, or an organic compound which liberates nitrogen, for instance an azine, hydrazine or hydrazide. Specific examples are sodium carbonate or bicarbonate; and diazoaminobenzene, 2,2'-azobisisobutyronitrile, dinitrosopentamethylenetetramine and azodicarbonamide. With the plasticizer and blowing agent the PVC is present in a composition of a suitable viscosity, which can contain optional additives such as for example thickening agents, diluents, stabilizers and pigments. Where a thickening agent is needed a suitable substance can be a metal salt of stearic or oleic acid, such as aluminum stearate; a silica aerogel; or calcium carbonate. A diluent or extender can for example be a chlorinated wax, or a high molecular weight alcohol or glycol. A stabilizer that is often useful in a heat stabilizer such as a barium, cadmium, zinc, or lead salt of an organic acid, such as lead phthalate.

In the production of an expanded PVC of the usual leather-like cloth type the PVC composition is applied to a woven or non-woven textile fabric, which is in many instances a cotton fabric, but it can be a fabric composed of any suitable natural or synthetic fiber, for example a nylon, an acrylonitrile copolymer, polypropylene, a polyurethane, a polyester, or cellulose acetate. The weave can be open or close, depending upon the type of product desired. The general consideration in preparing the PVC composition for application to the textile fabric is that it should have the correct yield value, that is to say a viscosity such that the composition adheres to the textile fabric but does not soak through it. Where a fine woven fabric is employed the PVC composition need not be so viscous as it is when a more open weave fabric is used. The less viscous compositions need not contain a thickening agent. The PVC composition is applied to the textile base in a quantity which will give the required layer of expanded PVC. The composition can be coated in the range of 80 to 1200 grams per square yard, preferably in the range of 200 to 800, such as 500, grams per square yard.

The invention is illustrated by the following examples.

EXAMPLE 1

This example describes the production of a leather-like cloth having a nylon coating applied by means of the invention.

An adhesive consisting of a solution containing 10% by weight of solids of a mixture of 70% polyurethane rubber (Desmocoll 400) and 30% m-tolylene di-isocyanate dissolved in ethyl acetate was applied by spraying to the top surface of a sheet of a textile-backed black expanded PVC, the layer of expanded PVC being about 0.75 mm. thick.

The adhesive was allowed to dry for a short time, and then there was sprayed on to it a nylon composition consisting of a solution containing 50% by weight of solids in methanol of an alcohol-soluble nylon of the nylon 6,6 type. This was allowed to dry and harden by exposing it to a current of hot air at 100° C. A second nylon coating was applied in a similar way.

The resulting product had a smooth nylon surface, but after it had been crumpled a few times the surface contained the large number of fine wrinkles characteristic of a high grade soft leather.

EXAMPLE 2

This example describes the application of a nylon coating to a sheet of PVC by the process of the invention.

An adhesive consisting of a solution containing 12% by weight of solids of a mixture 75% polyurethane rubber containing free hydroxyl groups and 25% m-tolylene di-isocyanate dissolved in cyclohexanone was applied by brushing to the surface of a flexible sheet of PVC plasticized with dioctyl phthalate.

The adhesive was allowed to gel, and then a nylon composition was applied consisting of a solution containing 40% by weight of solids in trichloroethylene of a nylon of the type described in Example 1; the composition also contained a silica aerogel thickening agent. The nylon composition was allowed to dry and then pressed on to the substrate by means of hot rollers. A second nylon coating was applied in a similar manner.

The resulting product possessed a durable nylon coating.

EXAMPLE 3

The adhesive and the nylon composition described in Example 2 were employed in a similar way to apply a good-quality nylon coating to a non-woven fabric prepared from a polyacrylonitrile copolymer comprised of 94% acrylonitrile and 6% vinyl acetate.

EXAMPLE 4

The adhesive and nylon composition described in Example 1 were employed in a similar way to apply a nylon coating to a sheet of vinyl chloride-vinyl acetate copolymer which was reinforced with a non-woven textile fabric.

The coated product closely resembled a good quality leather after a period of flexing to cause a multitude of wrinkles in the surface of the nylon coating.

What is claimed is:

1. A process for producing a nylon-coated leather-like product comprised of a substrate bonded to a nylon coating, which comprises applying an adhesive in solution form consisting essentially of a polyurethane rubber and between 10 and 50%, based on the weight of the rubber, of an organic polyfunctional isocyanate to one side of the substrate, applying a coating of nylon in solution form onto the adhesive to form a layered structure, and heating the layered structure to unite the nylon to the substrate.

2. The process of claim 1 in which the product is flexed in order to impart fine cracks to the surface thereof.

References Cited

UNITED STATES PATENTS

| | | | |
|---|---|---|---|
| 2,430,479 | 11/1947 | Pratt et al. | 117—72 |
| 3,023,126 | 2/1962 | Underwood et al. | |
| 3,067,085 | 12/1962 | Limperos | 161—190 X |
| 3,255,068 | 6/1966 | Smith | 161—190 |
| 3,401,133 | 9/1968 | Grace et al. | |

WILLIAM D. MARTIN, Primary Examiner

R. HUSACK, Assistant Examiner

U.S. Cl. X.R.

117—72, 75, 76; 161—190, 227